United States Patent
Dahlquist et al.

[15] 3,638,659
[45] Feb. 1, 1972

[54] GRAIN LOSS MONITORING DEVICE

[72] Inventors: Robert L. Dahlquist, Rock Island; Maurice Klee, Rockton, both of Ill.

[73] Assignee: J. I. Case Company

[22] Filed: Apr. 3, 1970

[21] Appl. No.: 25,421

[52] U.S. Cl. ................................130/27 W, 56/DIG. 15
[51] Int. Cl. .......................................A01f 12/44
[58] Field of Search..................56/20, 21, DIG. 15; 130/24, 130/27 R, 27 W, 26

[56] References Cited

UNITED STATES PATENTS

| | | | |
|---|---|---|---|
| 3,515,144 | 6/1970 | Morrison | 130/26 |
| 3,202,154 | 7/1965 | Viebrock | 130/24 |
| 3,368,214 | 2/1968 | Swanson | 56/DIG. 15 |

FOREIGN PATENTS OR APPLICATIONS

| | | | |
|---|---|---|---|
| 53,446 | 5/1966 | Germany | 56/DIG. 15 |

*Primary Examiner*—Antonio F. Guida
*Attorney*—Dressler, Goldsmith, Clement & Gordon

[57] ABSTRACT

A monitoring device for indicating the loss of grain across the exit end of a crop separating mechanism supported within a crop receiving passageway. The monitoring device includes a conveyor extending across and below the exit end of the crop separating mechanism with the conveyor delivering any grain received therein to a flowmeter in communication therewith. The flowmeter is in the form of a vertical passageway with a platen disposed in the passageway and having a convex surface exposed to the path of flow of the grain. The platen is pivoted adjacent the side of the passageway and has an end portion extending beyond the pivot to cooperate with signal-generating means for indicating flow of grain through the flowmeter.

In one embodiment, the signal generating means takes the form of a circuit having a warning light and a switch with the switch actuated by the paddle in response to the flow of grain through the flowmeter. In another embodiment, the signal generating means is a circuit having an indicator and a variable resistor, the resistance of which is controlled by the paddle.

12 Claims, 6 Drawing Figures

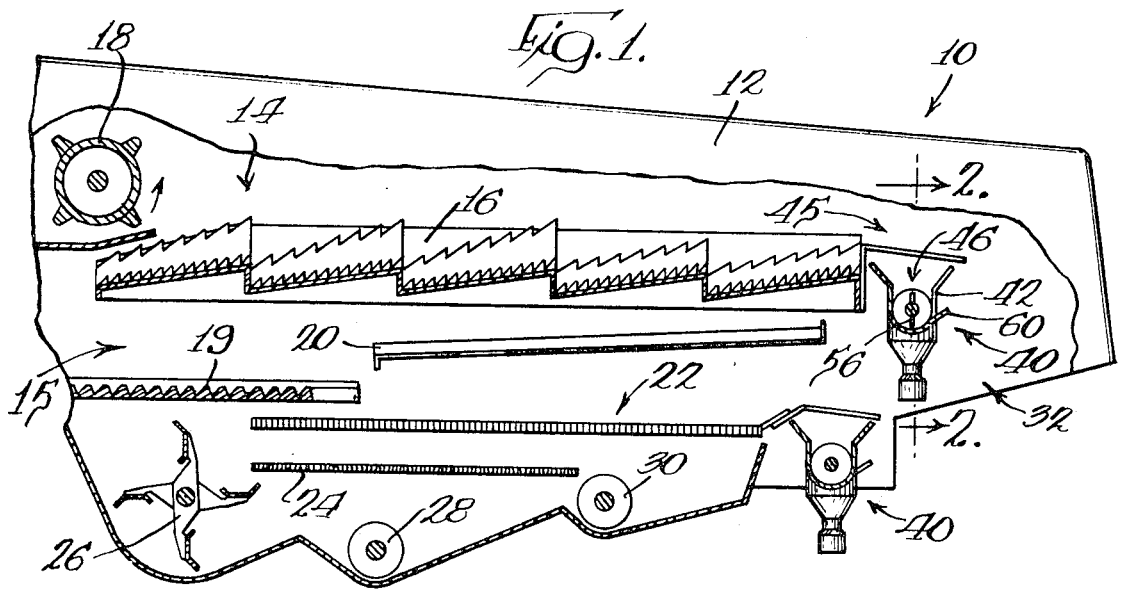
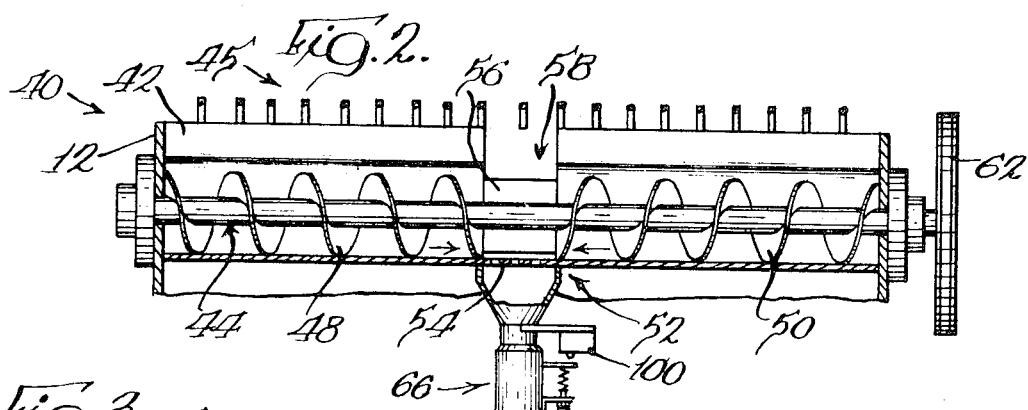
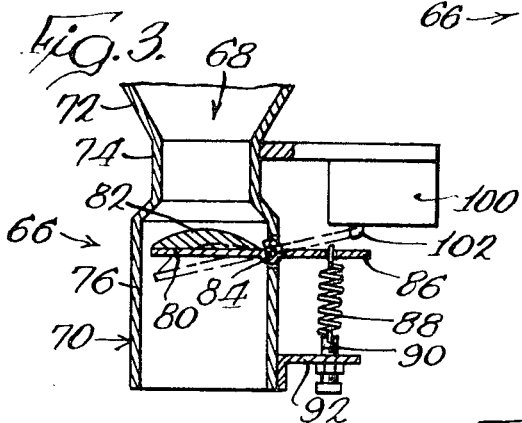
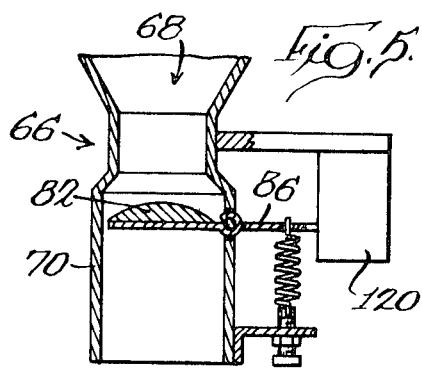
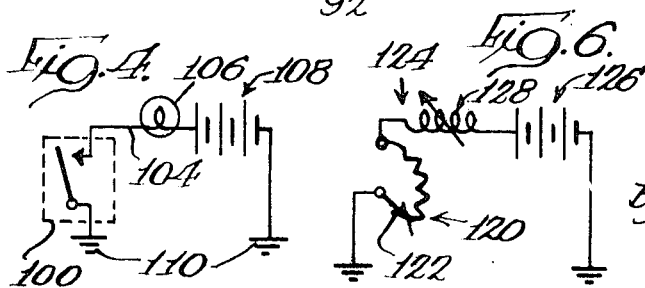

GRAIN LOSS MONITORING DEVICE

BACKGROUND OF THE INVENTION

The present invention relates generally to harvesting machines and, more particularly, to an improved monitoring device for indicating grain loss from the outlet of the machine.

In the operation of certain types of harvesting machines, such as combines, the harvested crop is passed through a threshing mechanism, wherein most of the kernels of grain are separated from the harvested material. The remainder of the harvested material, having some of the kernels of grain remaining therein, is then received on the crop separating structure or mechanism, such as a group of straw-walkers, disposed rearwardly of the threshing mechanism. The crop-separating mechanism has openings therein and is agitated to separate the remaining grain from the harvested material. Thereafter, the harvested material is passed across the rear end of the crop-separating mechanism and is delivered through an exit opening in the harvesting machine.

In the operation of a harvesting machine of this type, it is important to control the rate at which the crop is fed to the combine in order to prevent overloading of the machine. If the machine is overloaded, some of the grain will remain in the harvested material and will be lost through the exit opening of the combine. Heretofore, it has been customary for the operator to listen for the noise level of the machine to determine whether the material is being fed to the combine at a rate less than the maximum capacity of the machine.

With the recent emphasis upon comfort and automation of the combine, manufacturers have placed great emphasis upon the operator's compartment or cab of the combine. Thus, many of present-day harvesting machines have the operator effectively isolated from the remainder of the machine in an air-conditioned cab, which is substantially soundproofed to reduce the noise level therein. In such a machine, it is difficult for the operator to combine by "ear" and by "feel."

One of the problems encountered with combines of this type is that the operator is not aware of whether the threshing mechanism is overloaded. While combine grain monitoring devices are presently being marketed to indicate a loss of grain from the combine, these devices have not found any degree of commercial success. One of the problems is that most of the commercially available devices are marketed as attachments and usually incorporate very sensitive electronic equipment, which is extremely expensive. Another problem with commercially available monitoring devices is that the devices generally monitor only a limited area of the crop-separating mechanism. Thus, there still remains a need for a simple and efficient mechanism for determining grain loss from harvesting machines.

SUMMARY OF THE INVENTION

The present invention contemplates a simple and inexpensive grain loss monitoring device, which can readily be incorporated into harvesting machines and which monitors all of the grain lost through the outlet end of the combine. The present invention takes the form of a conveying means extending entirely across the outlet end of a crop-separating mechanism, which is supported within a crop receiving passageway of a combine. The conveying means delivers any grain received therein to a gravity feed flowmeter that cooperates with a signal generating means to indicate the flow of grain through the flowmeter.

In one embodiment, the signal generating means is in the form of an electric circuit incorporating a warning device, such as a light, and a switch, which is actuated in response to the flow of grain within the flowmeter, to complete the circuit to the warning device. In an alternative embodiment, the signal generating means includes an electric circuit having variable resistance means, the resistance of which is determined by the flow of grain through the flowmeter. The circuit incorporates some type of readout device, such as a galvanometer, for indicating the flow of grain through the flowmeter.

BRIEF DESCRIPTION OF SEVERAL VIEWS OF DRAWINGS

FIG. 1 is a fragmentary, longitudinal, vertical sectional view of a harvesting machine having the present invention incorporated therein;

FIG. 2 is a transverse sectional view taken generally along line 2—2 of FIG. 1;

FIG. 3 is an enlarged fragmentary sectional view of the monitoring device shown in FIG. 2;

FIG. 4 is a schematic illustration of a circuit forming part of the monitoring device shown in FIG. 3;

FIG. 5 is a view similar to FIG. 3 showing an alternative signal generating mechanism; and FIG. 6 shows a schematic illustration of a signal generating circuit forming part of the monitoring device of FIG. 5.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

With particular reference to the drawings, there is disclosed a harvesting machine or combine 10 having the present invention incorporated therein. The harvesting machine includes a housing 12 defining a longitudinally extending crop receiving passageway 14 having separating means 15 supported therein. The separating means includes a primary unit 16, which may be what is generally referred to as a straw-walker or a straw rack, mounted for oscillating movement within the passageway 14 by suitable means (not shown).

The primary unit 16 of the crop separating means or mechanism receives harvested material on the forward end thereof, which is delivered thereto by a beater mechanism, generally designated by the reference numeral 18. The harvested material received on the forward end of the primary unit or straw rack has most of the kernels of grain separated from the remainder of the harvested material. Thus, while the harvested material is agitated on the primary crop separating unit 16, the grain passes through openings (not shown) in the unit to be deposited upon either a grain pan 19, or a return pan 20. The return pan is tilted to deliver the grain across the forward end to the primary grain pan 19. Since the openings in the primary unit 16 are of substantial size, much of the chaff and other small particles of the harvested material pass through the openings. Therefore, the grain, as well as the smaller particles of harvested material, are delivered to a cleaning unit or shoe 22, which further separates the grain from the harvested material. The grain passing through openings in the cleaning shoe or secondary separating unit 22 is received onto a cleaning sieve 24 and a fan 26 is disposed adjacent the forward end of the cleaning sieve 24 to produce a flow of air rearwardly and force any of the lighter chaff from the grain. The clean grain is then deposited along a conveyor 28 to be delivered to a grain tank. The larger particles of harvested material received on the cleaning sieve, which are commonly referred to as "tailings," are delivered to a further conveyor 30 to be returned to the threshing cylinder (not shown) for further processing.

As was indicated above, it is absolutely essential that the operator be at all times aware of any grain which may remain on either the primary separating unit 16 or the secondary separating unit 22, all of which ultimately is delivered across the rear end of each of the respective units and is deposited on the ground through the exit opening 32 of the longitudinal passageway 14.

As was indicated above, grain monitoring attachments are commercially available, but so far as presently known, these devices only sample a small transverse area of the primary crop separating unit. Such a unit is highly undesirable, since research has shown that the crop which is received through the inlet end of the passageway 14 is not distributed across the entire width of the crop separating mechanism. Thus, grain may be lost over the rear end of the harvesting machine without being detected by units of the above type. Furthermore, an additional problem with prior art units is that such units generally have an indicating portion mounted in the operator's cab and the cab is generally not designed for such a unit. Also, the prior art units are very sensitive devices, which make it very difficult to isolate them from the vibration of the machine.

According to the present invention, the harvesting machine or combine 10 incorporates a monitoring device 40 for each of the primary and secondary separating units 16 and 22. Since each monitoring device 40 is identical in construction, only one will be described in detail.

Each grain loss monitoring unit or device 40 includes separating conveyor means extending transversely across the passageway 14 and including a substantially U-shaped trough 42 extending between opposed sidewalls of the housing 12 with a conveyor 44 disposed in the trough 42. The trough 42 has an inlet end 46, which is disposed below the rear or exit end of one of the crop separating units, 16 or 22. The inlet end 46 of the trough has tines or screen means 45 for preventing the majority of the harvested material from entering the trough 42.

The conveyor 44 is in the form of an auger having left-hand and right-hand flights 48 and 50 for delivering any material in the trough 42 to a central or intermediate area 52 of the trough 42. The central intermediate area of the trough has an apertured floor portion 54 with the apertures or openings being of sufficient size as to allow the kernels of grain to pass therethrough, while preventing chaff and larger particles of material from entering the flowmeter, which will be described later.

The separating conveying means further includes means for removing any harvested material from the trough and is illustrated as a paddle 56 located between the adjacent ends of the flights 48 and 50 of the auger conveyor 44. The trough 42 has a recess 58 in alignment with the paddle 56 and an outwardly turned flange 60, so that the rotation of the conveyor 14 and the paddle 56 will force any harvested material, other than grain, from the intermediate area of the trough through the recess or outlet 58.

The rotation of the conveyor auger 44 may be accomplished through a drive belt received on a pulley 62, fixed to one end of the shaft forming part of the conveyor. Thus, rotation of the pulley 62 will force any materials within the trough 42 towards the apertured, central floor portion 52 and will allow the kernels of grain to pass through the apertures therein. At the same time, any other harvested material received into the trough 42 will be removed therefrom through the rotation of the paddle 56 and exit through the recess 58.

The monitoring device 40 further includes a flowmeter 66 having its upper end in communication with the central apertured floor portion 54. The flowmeter 66 is more clearly illustrated in FIG. 3 and includes means for receiving the grain from the conveyor means and, more particularly, vertical passage means defined by a tube 70 having an outwardly tapered upper end portion 72, a reduced area intermediate portion 74, and an enlarged lower portion 76. Thus, all of the grain received through the apertures will be directed by the tapered portion 72 towards the intermediate area 74 of the passage 68.

The flowmeter 66 of the monitoring device 40 further includes a mechanism or means disposed within the passageway 68 for indicating the flow of grain therein. The mechanism or member is in the form of a platen 80 having an upper convex surface 82 exposed to the path of flow of the grain being gravity-fed into the upper end of the passage 68. The platen is pivoted about a pin 84 supported within the side of the tube 70 with a portion of the platen or an arm 86 extending beyond the pivot pin 84. A spring 88 is connected to the arm 86 and has its opposite end connected to an adjustment screw 90 threaded into a bracket 92. The spring 88 thus maintains the intermediately pivoted platen in the solid line, or first position shown in FIG. 3, which is defined by a stop (not shown).

In operation, when grain is delivered over the rear end of the crop-separating mechanism or means, the grain will be delivered, by gravity, into the trough 42 to be delivered by the conveyor 44 to the passageway 68 and will strike the upper surface 82 of the platen 80 as it flows through the passage 68. The free-falling bodies of grain, having kinetic energy as they strike the platen, will cause a pivotal movement of the platen from the first position to a second position (shown by the dotted line of FIG. 3) to indicate a grain loss through the outlet end of the separating mechanism.

The grain monitoring device 40 further includes electric circuit means or signal generating means cooperating with the flowmeter for producing an indication of grain loss across the end of the separating mechanism. In the embodiment illustrated in FIGS. 3 and 4, the signal generating means includes a normally open switch 100 having an actuating button 102 disposed in the path of pivotal movement of the arm 86. The switch 100 forms a part of an electrical circuit 104 having a warning device 106, such as a light, and a voltage source 108, with the circuit being suitably grounded at 110. As the mechanism or platen 80 is pivoted from the first position to the second position by the flow of grain through the passage 68, the switch 102 will be actuated to energize the warning device 106.

A slightly modified signal generating means is disclosed in FIGS. 5 and 6 which cooperates with the flowmeter 66. The signal generating means disclosed in FIGS. 5 and 6 includes a variable resistance means 120 having a resistance determined by the position of the arm 86, which positions the adjustable contact 122 of the variable resistor 120. The adjustable resistor 120 is again incorporated in a circuit 124 having a source of voltage 126 and an indicating device or readout 128, such as a galvanometer. The indicating device 128 may readily be incorporated into the control panel of the operator's cab (not shown), so that the operator will immediately be apprised of the fact that grain is being lost through the exit end 32 of the combine 10.

The operation of the entire unit is believed to be apparent from the above description. Any grain that remains in the harvested material delivered across the outlet or rear end of the crop separating mechanism passes through the screen means 45 extending across the trough 42 and is received into the lower portion or floor of the trough. The auger conveyor 44 then moves the grain and some smaller particles of harvested material, which pass through the screen means or tines towards the center area of the trough, defined by the perforated floor portion 54. The kernels of grain will then fall through the apertures while the remainder of the harvested material will be forced by the paddles 56 through the recess 58. The free-falling kernels of grain will strike the platen and the kinetic energy thereof will be absorbed by the platen to pivot the platen about the pin 84. When a sufficient number of kernels of grain are passing through the passageway 68, in the embodiment illustrated in FIG. 3, the platen will be pivoted sufficiently to actuate switch button 102 and complete the circuit 104 to the warning light 106, indicating to the operator that the grain loss exceeds a predetermined level. The convex upper surface 82 of the platen or mechanism 80 will prevent the accumulation of any of the kernels of grain on the upper surface 82.

In the alternative embodiment disclosed in FIGS. 5 and 6, any kernels of grain passing through the passage 68 will pivot the platen 80 and cause the arm thereof to move the adjustable contact 122 indicating through the indicator 128 that grain is flowing through the passage 68.

It will be appreciated that the present invention provides a simple and inexpensive manner of monitoring the loss of grain from a combine. The mechanism includes a minimum number of parts and, particularly, the electrical circuitry is very inexpensive and can readily be incorporated into any present-day machine.

What is claimed is:

1. In a harvesting machine having a longitudinally extending crop receiving passageway with a crop separating means supported in said passageway for separating grain from the remainder of harvested material received in said passageway, said separating means depositing the remainder of the harvested material at an exit end of said passageway, the improvement of a grain loss monitoring device for detecting the loss of grain through said exit end and comprising separating conveyor means extending transversely of said passageway and disposed below the exit end of said crop separating means for receiving grain from the exit end of said separating mechanism; means for removing harvested material, other than grain, from said separating conveyor means; means for receiving said grain from said separating conveyor means; mechanism associated with said last means and disposed in the path of flow of said grain; and signal generating means cooperating with said mechanism for indicating the amplitude of the flow of grain in said last means.

2. A harvesting machine as defined in claim 1, in which said separating conveyor means comprising a trough having a conveyor therein and means extending across said trough for preventing harvested material from entering said trough; said means for receiving said grain defines a vertical passage communicating at the upper end with said trough; and said mechanism comprises a member pivotally mounted adjacent one side of said passage with one end disposed in said passage.

3. A harvesting machine as defined in claim 1, in which said signal generating means comprises a circuit having a warning device therein and switch means actuated by said mechanism for completing said circuit.

4. A harvesting machine as defined in claim 1, in which said signal generating means comprises a circuit having variable resistance responsive to movement of said mechanism.

5. A harvesting machine as defined in claim 1, in which said separating means comprises a primary unit and a secondary unit with a grain loss monitoring device for each of said units.

6. A harvesting machine as defined in claim 1, in which said means receiving said grain define a vertical passage means for receiving grain by gravity feed, and said mechanism includes a pivoted member in said passage means and disposed in the path of grain passing through said passage means, said member being pivoted from a first position in response to the flow of grain in said passage means; and means for indicating pivotal movement of said member to indicate grain loss.

7. A harvesting machine as defined in claim 6, in which said member defines a convex surface exposed to the path of grain.

8. A harvesting machine as defined in claim 6, in which said last means produces an output signal as a function of the amount of flow of grain in said passage means.

9. A harvesting machine as defined in claim 6, in which said last means produces a warning signal when said member is pivoted to a second position.

10. A harvesting machine as defined in claim 6, in which said member comprises a paddle pivoted intermediate its ends and having a convex upper surface on one end disposed in said path.

11. A harvesting machine as defined in claim 10, in which said means for indicating pivotal movement comprises a switch disposed in the path of the opposite end of said paddle; circuit means connected to said switch, said circuit means incorporating a warning signal operated in response to actuation of said switch by said paddle.

12. A harvesting machine as defined in claim 1, in which said trough has an apertured floor portion aligned with said vertical passage and said conveyor has a paddle aligned with said apertured floor portion to removing harvested material from said apertured floor portion.

* * * * *

UNITED STATES PATENT OFFICE
CERTIFICATE OF CORRECTION

Patent No. 3,638,659        Dated February 1, 1972

Inventor(s)   ROBERT L. DAHLQUIST & MAURICE KLEE

It is certified that error appears in the above-identified patent and that said Letters Patent are hereby corrected as shown below:

Column 3, line 8, "make" should be --makes--.

Column 3, line 52, "paddle" should be --paddles--.

Column 5, line 33, insert --means-- after "resistance".

Signed and sealed this 27th day of June 1972.

(SEAL)
Attest:

EDWARD M. FLETCHER, JR.
Attesting Officer

ROBERT GOTTSCHALK
Commissioner of Patents